United States Patent
Sprague

(10) Patent No.: US 10,365,947 B2
(45) Date of Patent: Jul. 30, 2019

(54) MULTI-CORE PROCESSOR INCLUDING A MASTER CORE PERFORMING TASKS INVOLVING OPERATING SYSTEM KERNEL-RELATED FEATURES ON BEHALF OF SLAVE CORES

(71) Applicant: Hewlett Packard Enterprise Development LP, Houston, TX (US)

(72) Inventor: Fred A. Sprague, Fort Collins, CO (US)

(73) Assignee: HEMETT PACKARD ENTERPRISE DEVELOPMENT LP, Houston, TX (US)

( * ) Notice: Subject to any disclaimer, the term of this patent is extended or adjusted under 35 U.S.C. 154(b) by 297 days.

(21) Appl. No.: 15/318,501

(22) PCT Filed: Jul. 28, 2014

(86) PCT No.: PCT/US2014/048403
§ 371 (c)(1),
(2) Date: Dec. 13, 2016

(87) PCT Pub. No.: WO2016/018212
PCT Pub. Date: Feb. 4, 2016

(65) Prior Publication Data
US 2017/0132034 A1 May 11, 2017

(51) Int. Cl.
*G06F 9/46* (2006.01)
*G06F 9/48* (2006.01)
(Continued)

(52) U.S. Cl.
CPC .............. *G06F 9/48* (2013.01); *G06F 9/4856* (2013.01); *G06F 9/545* (2013.01);
(Continued)

(58) Field of Classification Search
None
See application file for complete search history.

(56) References Cited

U.S. PATENT DOCUMENTS 7,516,456 B2 * 4/2009 Aguilar, Jr. ........... G06F 9/4881
718/102
7,647,519 B2 1/2010 Heller et al.
(Continued)

FOREIGN PATENT DOCUMENTS

| CA | 2446983 | 11/2002 |
|---|---|---|
| KR | 20080065791 | 7/2008 |
| KR | 20110085767 | 7/2011 |

OTHER PUBLICATIONS

International Searching Authority, The International Search Report and the Written Opinion, PCT/US2014/048403, dated Apr. 22, 2015, 10 Pgs.

*Primary Examiner* — Bing Zhao
(74) *Attorney, Agent, or Firm* — Hewlett Packard Enterprise Patent Department

(57) ABSTRACT

A multi-core processor comprises a plurality of slave cores, the slave cores being without operating system kernel-related features, and the slave cores to execute respective instructions. A master core configures the operating system kernel-related features on behalf of the slave cores. The master core is to control usage of the operating system kernel-related features during execution of the instructions on the respective slave cores.

15 Claims, 4 Drawing Sheets

(51) Int. Cl.
  *G06F 9/54*  (2006.01)
  *G06F 15/80*  (2006.01)

(52) U.S. Cl.
  CPC .... *G06F 15/8038* (2013.01); *G06F 2209/483* (2013.01); *Y02D 10/24* (2018.01); *Y02D 10/32* (2018.01)

(56) References Cited

U.S. PATENT DOCUMENTS

| | | |
|---|---|---|
| 7,873,507 B2 | 1/2011 | Tatsuoka et al. |
| 8,316,368 B2 | 11/2012 | Vestal et al. |
| 8,321,876 B2 | 11/2012 | Lee et al. |
| 8,434,127 B2 | 4/2013 | Sakai |
| 8,601,288 B2 | 12/2013 | Brinks et al. |
| 2009/0307464 A1 | 12/2009 | Steinberg et al. |
| 2012/0029900 A1 | 2/2012 | Papariello |
| 2013/0043917 A1 | 2/2013 | Cesare et al. |
| 2013/0179710 A1 | 7/2013 | Chang et al. |
| 2014/0122833 A1 | 5/2014 | Davis et al. |
| 2015/0007187 A1* | 1/2015 | Shows ................ G06F 9/5088 718/104 |
| 2015/0295830 A1† | 10/2015 | Talla et al. |

\* cited by examiner
† cited by third party

MULTI-CORE PROCESSOR INCLUDING A MASTER CORE PERFORMING TASKS INVOLVING OPERATING SYSTEM KERNEL-RELATED FEATURES ON BEHALF OF SLAVE CORES

BACKGROUND

A computing device can include a processor to perform computation tasks. In some examples, a processor can include multiple cores that are able to concurrently execute instructions.

BRIEF DESCRIPTION OF THE DRAWINGS

Some implementations are described with respect to the following figures.

DETAILED DESCRIPTION

Figure 1:
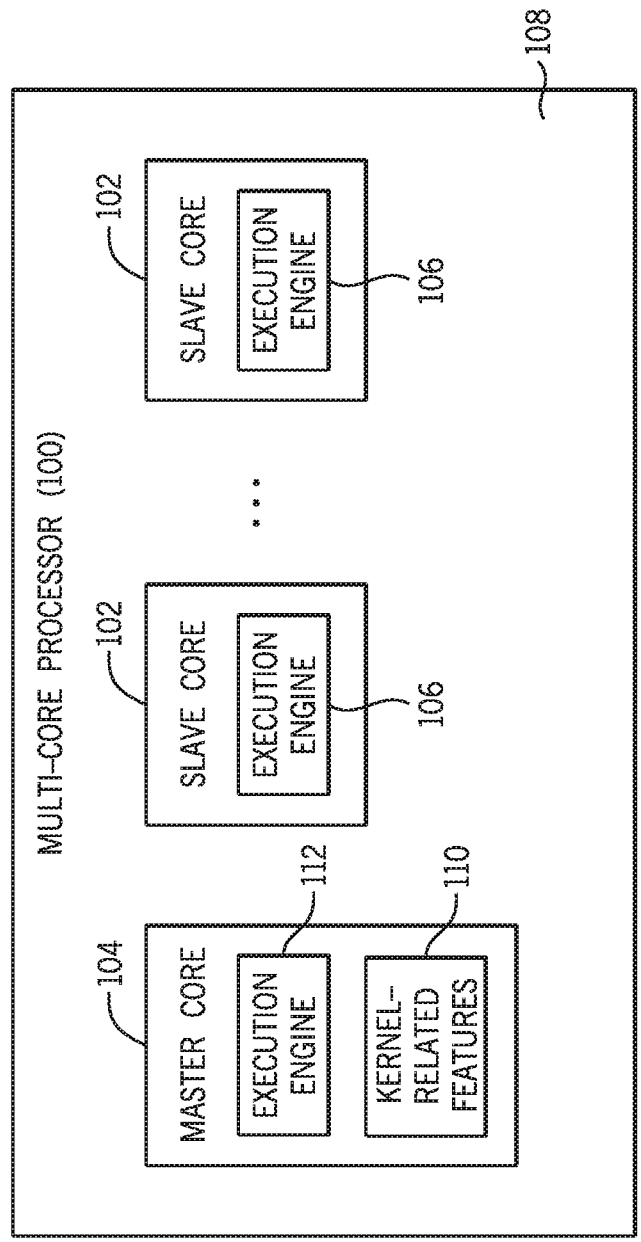
FIG. 1 is a block diagram of an example multi-core processor according to some implementations.

Each of multiple cores of a multi-core processor can include elements to support the execution of machine-readable instructions. The elements of a core can include an execution engine (or execution pipeline), which performs the execution of machine-readable instructions. In addition, the elements of the core can also include various features that are related to an operating system kernel. An "operating system kernel" (or more simply, a "kernel") can refer to a part of an operating system of a computing device (e.g. desktop computer, notebook computer, tablet computer, server computer, smartphone, personal digital assistant, game appliance, etc.) that manages various central tasks of the operating system, such as managing memory space in which machine-readable instructions are executed, managing requests for use of hardware components, managing a file system, and so forth.

The features related to a kernel (also referred to as "kernel-related features" or "operating system kernel-related features") are those features that are useable by and/or controlled by the kernel. Certain actions associated with machine-readable instructions, or more simply "instructions" (such as those of an application process), executed on a core can invoke or otherwise involve the kernel. An application process can refer to a process of an application program that executes in a computing device. Note that a process can refer to executable instructions, and can also refer to a thread of the process (for examples where multiple threads of a process can be executed).

As examples, if instructions executed on the core attempt to access a hardware component, e.g. a graphics controller, a network interface controller, etc., then the kernel is invoked to perform the access of the hardware component on behalf of the machine-readable instructions. In some examples, the features of the core that are used by the kernel to access a hardware component can include an Advanced Configuration and Power Interface (ACPI) interface logic that the kernel can access to obtain information about a specific hardware component.

As another example, when instructions executing on a core attempt to access memory, such as a read of or write to memory, then the kernel may be invoked under certain conditions. A core can include control logic for controlling a translation look-aside buffer (TLB), which includes entries that each includes information to translate a virtual address to a physical address. A virtual address is part of a virtual memory space as seen by machine-readable instructions executing on a core. A physical address identifies a location of physical memory.

The TLB has a specific number of entries that can store a relatively small subset of translations between virtual addresses and physical addresses, such as the translations for the most recently accessed virtual addresses. When instructions issue a memory access to a virtual address, the core performs a lookup of the TLB to determine if the corresponding virtual-to-physical address translation is in the TLB. If so, then a TLB hit has occurred, and the mapped physical address from the TLB is used to access the respective location in physical memory.

However, if the accessed virtual address is not included in the TLB, then a TLB miss occurs. A TLB miss can result in an exception that is handled by the kernel. The kernel accesses data structures (such as page tables, for example) that store all virtual-to-memory address translations to retrieve the corresponding translation information associated with the TLB miss. The retrieved translation information can then be used to populate, using the TLB control logic of the core, the TLB. The physical address derived from the retrieved translation information can be used to complete the memory access.

In addition to the foregoing, a core can also include other kernel-related features.

The cores of a traditional multi-core processor are configured as full-functional cores with various kernel-related features used or controlled by a kernel. Instructions executing on a core can perform a system call when performing certain tasks, such as to access a hardware component, perform memory management, process control, and so forth. A system call triggers the kernel to perform a corresponding task, such as to access information of a hardware component, perform a memory management task (that includes handling a TLB miss, for example), process control (to schedule and/or control the execution of one or multiple processes), and so forth.

Upon triggering the kernel, a context switch is made from the user space (space of the application process, for example) to the kernel space. A "context" can include information regarding a state of execution of a process (e.g. the application process or the kernel), and data used by the process. Context switching is wasteful of resources of a core, since the content of cache memory and registers is swapped with the different context.

In accordance with some implementations, as shown in FIG. 1, a multi-core processor 100 is provided with multiple simplistic slave cores 102 and a master core 104 (or multiple master cores). In the ensuing discussion, reference is made to a multi-core processor that has one master core; however, it is noted that techniques or mechanisms according to some implementations are applicable to a multi-core processor that includes multiple master cores. The slave cores 102 are relatively simple cores without kernel-related features (e.g. TLB control logic, ACPI interface logic, etc.). However, each slave core 102 includes a respective execution engine 106 that is able to execute instructions of application processes, for example.

The master core 104 and the slave cores 102 can be integrated into a single integrated circuit chip or die, for example. In other examples, the master core 104 and the slave cores 102 can be provided on a circuit board. In FIG. 1, the master core 104 and the slave cores 102 are arranged on a support structure 108, where the support structure 108 can be an integrated circuit chip or die, or a circuit board, as examples.

Without kernel-related features, the slave cores 102 are unable to enter into a privileged mode (also referred to as a "ring 0 mode" in some examples) in which the kernel is executed on the respective slave core 102 to perform a requested task. As a result, instructions can run on a slave core 102 with reduced interruption, since context switching does not have to be performed between a user space and kernel space. This can increase the efficiency of usage of a slave core 102 by an application process, and can also increase the security of the system as the slave core cannot access kernel-related features except through the defined interface to the master core. Additionally, the slave cores 102 can have simpler designs (than fully functional slave cores) that take up less space on a die and consume less power.

The master core 104 includes kernel-related features 110. At least a portion of the kernel-related features 110 is configured by the master core 104 for the slave cores 102. In some examples, the kernel-related features 110 can be divided into multiple groups of kernel-related features 110, where each group of kernel-related features is dedicated to a respective one of the slave cores 102. A group of kernel-related features is dedicated to a slave core 102 if the group of kernel-related features is for use in relation to tasks of instructions executing on the slave core 102, Note that another portion of the kernel-related features 110 is dedicated to the master core 104.

In examples where multiple master cores 104 are included in a multi-core processor, each of the master cores 104 can include its respective kernel-related features 110.

For example, different TLB control logic (and respective groups of TLBs) can be configured for different slave cores 102, where a first TLB control logic and a respective group of TLBs can be configured for a first slave core 102, a second TLB control logic and a respective group of TLBs can be configured for a second slave core 102, and so forth. In this manner, by dedicating respective TLB control logic and a respective group of TLBs to each slave core 102, more efficient TLB operation can be achieved. This can avoid the situation where TLBs and respective control logic are shared by multiple application processes, which can result in reduced efficiency if the content of TLBs have to be swapped depending on which of the multiple application processes is active. Note that although the TLB control logic can be part of the master core 104, the TLBs themselves may be located separately from the master core 104; for example, the TLBs can be part of a memory subsystem.

By configuring kernel-related features by the master core 104 for the slave cores 102, the kernel-related features are available for use during execution of instructions on the slave cores 102, without having to include such kernel-related features in the slave cores 102. Configuring kernel-related features by the master core 104 for a slave core 102 can refer to setting up or otherwise establishing the kernel-related features for use by or on behalf of the slave core 102.

During execution of instructions (such as of application processes) on the slave cores 102, the master core 104 controls usage of the kernel-related features 110 on behalf of the slave cores 102 when appropriate, which can reduce context switching, cache line loss, and so forth at the slave cores 102, and which can lead to improved performance. As an example, if TLB content is to be updated for access of a file by an application process executing on a slave core 102, the master core 104 can be triggered to perform the update of the TLB content.

As further shown in FIG. 1, the master core 104 can also include an execution engine 112 for executing instructions on the master core 104. Although not shown in FIG. 1, each master core 104 and slave core 102 can include local cache memory, registers, bus interfaces, and so forth.

Figure 2:
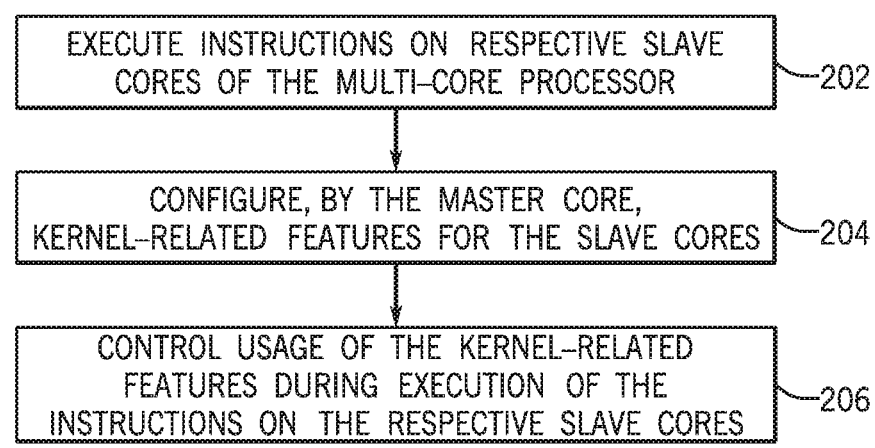
FIG. 2 is a flow diagram of example tasks of a multi-core processor according to some implementations.

FIG. 2 is a flow diagram of tasks that can be performed by the multi-core processor 100 of FIG. 1. Instructions are executed (at 202) on respective slave cores 102 of the multi-core processor 100, where the slave cores 102 are without kernel-related features. The master core 104 configures (at 204) kernel-related features (110 in FIG. 1) for the slave cores 102. The master core 104 controls (at 206) usage of the kernel-related features during execution of the instructions on the respective slave cores 102.

In some examples, threads of a single process can run on multiple slave cores 102 of the multi-processor core 100 of FIG. 1. These threads of the single process can share a context domain—in other words, the threads share data that can be stored in a memory subsystem. If instructions executing on multiple slave cores 102 share a context domain, then a coherency mechanism can be provided to ensure data coherency of the shared data between the multiple slave cores 102.

In a computing device that includes multiple multi-processor cores 100, the different multi-processor cores 100 can execute respective different processes. In this execution mode, context switching between processes does not occur, which can result in increased performance for the processes.

Cores that are not actively executing processes can be powered down, or at least have their execution clocks stopped, thereby providing power savings.

Figure 3:
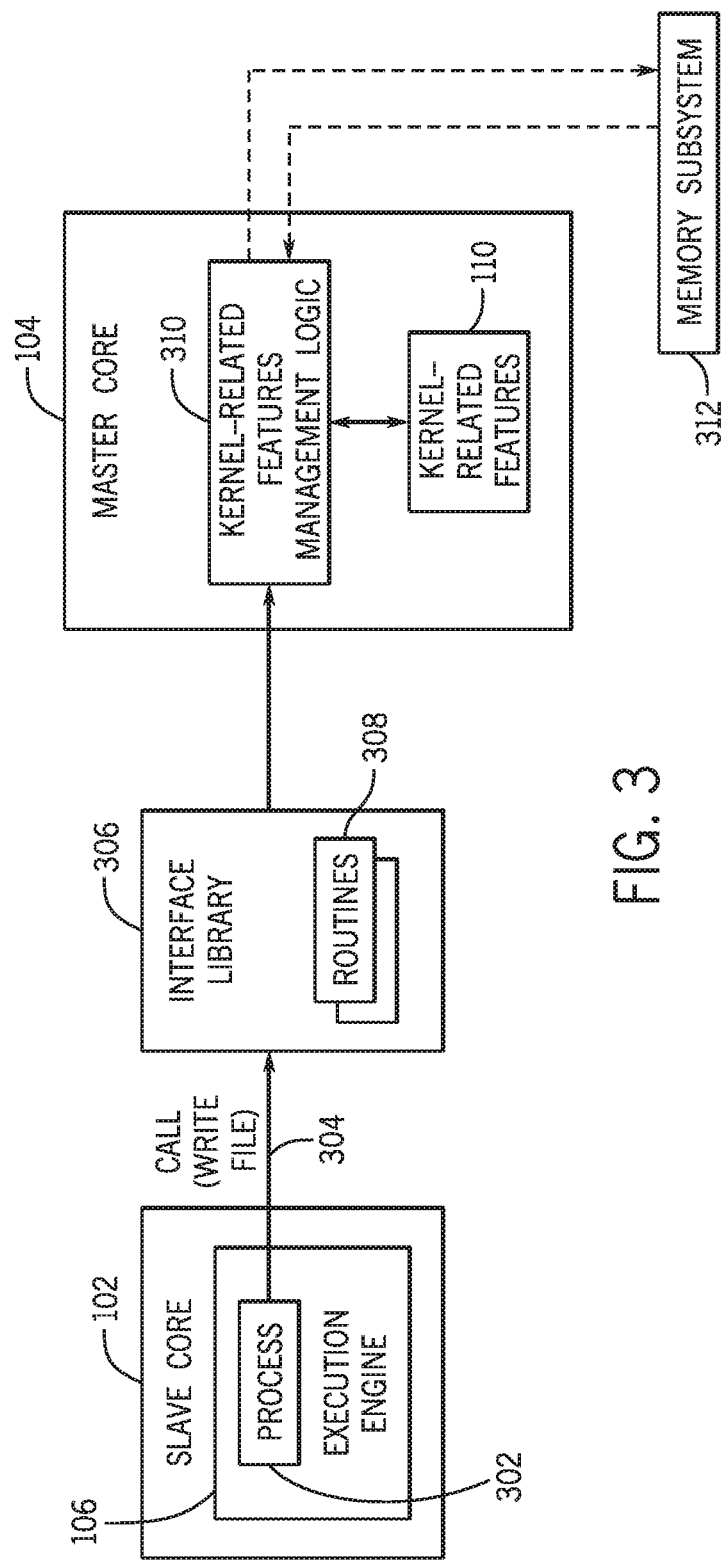
FIG. 3 is a schematic diagram of an example arrangement that includes a slave core, a master core, a library interface, and a memory subsystem, according to some examples.

FIG. 3 is a schematic diagram of an arrangement that includes a slave core 102, the master core 104, an interface library 306, and a memory subsystem 312. The memory subsystem 312 can include memory media (e.g. one or multiple memory devices and associated memory management logic located locally or remotely).

The interface library 306 includes library routines 308 (which can be in the form of machine-readable instructions) that can be invoked in response to calls from a process (e.g. 302) executed by the execution engine 106 of the slave core 102. The interface library 306 can be implemented as part of the multi-core processor 100 of FIG. 1, or external of the multi-core processor 100. In some examples, the interface library 306 can be part of the master core 104.

FIG. 3 shows an example in which the process 302 makes a call (304) to write a file, which can be stored in the memory subsystem 312. Note that the call (304) differs from a system call performed by a process to trigger a kernel to perform a requested task.

Instead, the call (304) triggers execution of a library routine 308 in the library interface 306. Note that different calls (corresponding to different actions) can cause triggering of different library routines 308. Once the process 302 makes the call (304), the process 302 stops or pauses while waiting for a response to the call (304), or in other cases (such as this example of writing to a file), continues to execute without interruption. The system response to the invoked library routine 308 can be handled by the master core 104. The invoked library routine 308 can provide information pertaining to the call (304) to a kernel-related features management logic 310 that is part of the master core 104. The kernel-related features management logic 310 can be implemented as hardware circuitry or as hardware processing circuitry and machine-readable instructions executed on the hardware processing circuitry. In some examples, the kernel-related features management logic 310 can configure kernel-related features for a slave core 102, and control usage of the kernel-related features during execution of instructions on a slave core.

The kernel-related features management logic 310 determines from the information pertaining to the call (304) that a write to a file is requested. In response, the kernel-related features management logic 310 can interact with the memory subsystem 312 to determine an address for the file. The determination of the address can be based on obtaining a virtual address-to-physical address translation information, for example. This address translation information can be returned to the kernel-related features management logic 310, which can update a respective TLB, for example.

The master core 104 then can instruct, through the invoked library routine 308, the process 302 in the slave core 102 to continue running. In some cases (such as when writing a file), the slave core 102 does not pause in execution but simply writes the file contents to memory and continues execution, depending on another core (the master core 104 in this case) to consume the write and deliver the write to the appropriate destination.

In further cases, it may not be the master core 104 that handles the library response; instead, another slave core can handle the response for the invoked library routine 308. An example of this may be when a database request is issued by a first slave core, in which case a second slave core has access to the database and the first slave core makes a request for data from that database. For this type of request all communications between the two slave cores would be through a common memory interface handled by the interface library (306)

More generally, instead of providing the library interface 306 that includes library routines 308, an interface can be provided between the slave core 102 and the master core 104, to allow a call made by a process running on the slave core 102 to trigger a respective action at the master core 104. In this way, execution of a kernel at the slave core 102 can be avoided, which can improve efficiency of the slave core 102.

Certain tasks, such as memory management tasks (which can involve management with respect to TLBs) and hardware component accesses, can be performed by the master core 104 on behalf of a slave core 102, without triggering kernel interaction. By providing the library interface 306 (or other like interface), an application process does not have to be aware that no kernel is involved in response to calls made by the application process to perform certain tasks.

However, there may be certain situations where a kernel has to be triggered, such as when a memory exception occurs due to memory running out of space. In such cases, the master core 104 is involved to resolve the request.

By employing the master core 104 to handle kernel functions, the slave cores 102 do not have to pause or context switch in some cases. Traditionally, even simple kernel functions, such as "getPid( )" (to obtain the identifier of a process) or "getTimeOfDay( )" (to obtain a time of day), trigger a kernel context switch to return a simple numeric value. The kernel context switch refers to performing a context switch between the user space and kernel space, which pauses the user process. By employing the master core 104 to perform kernel functions (such as those above), the kernel functions can return values that are accessible to the slave cores directly without kernel involvement. The returned values can be in write-protected memory.

Other functions, such as "openFile( )" (to open a file), involve kernel action that would determine physical access to the file and map the file into the slave core 102 address space. In the case of openFile( ), the user process running on a slave core 102 may or may not be aware of the address mapping. If not aware of the address mapping, then the interface library 306 can hide that mapping through existing interfaces such as "read( )" accessing the mapped addresses without any kernel involvement after the initial mapping.

Kernel functions such as adding additional memory resources or handling illegal memory access can also automatically trigger kernel involvement, pausing the slave core 102 until the master core 104 can resolve the issue.

Figure 4:
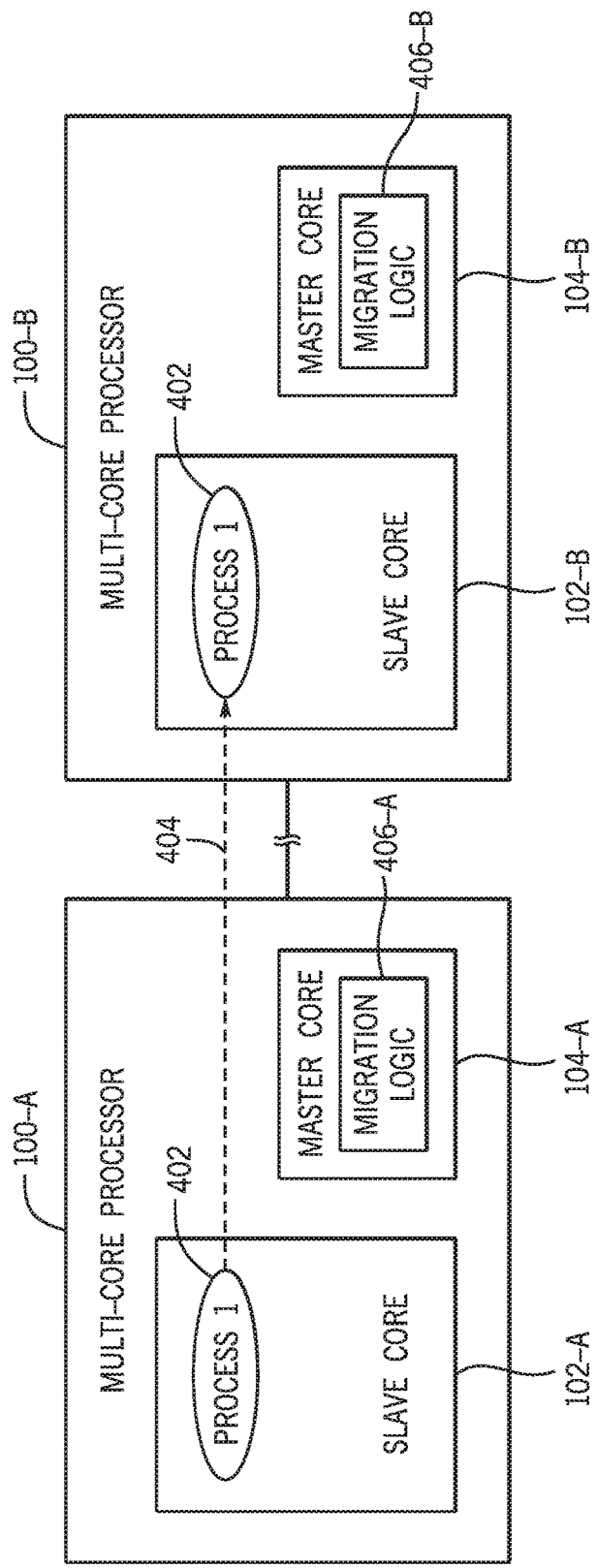
FIG. 4 is a schematic diagram of an example arrangement to migrate a process from one multi-core processor to another multi-core processor, according to further implementations.

FIG. 4 shows an example of a computing device that includes multiple multi-core processors (100-A and 100-B shown in FIG. 4). In accordance with further implementations, it is possible to move or migrate (at 404) a process (e.g. 402) running on a slave core 102-A of the multi-core processor 100-A to a slave core 102-B of the multi-core processor 100-B. The process 402 can refer generally to instructions that can execute on a slave core.

The "context" of a process in this implementation is primarily the mapping of the process' memory addresses to the physical memory space. That mapping is held and controlled in the master core 104. To migrate a process from one slave core (102-A) to another slave core (102-B), the same mapping can be created in the destination slave core (102-B) to match the mapping in the source slave core, to allow the destination slave core to continue execution where the source slave core left off.

The moving of the process 402 is managed by migration logic 406-A and 406-B in respective master cores 104-A and 104-B of the multi-core processors 100-A and 100-B. Each migration logic 406-A and 406-B can be implemented as hardware circuitry or as a combination of hardware processing circuitry and machine-readable instructions executed on the hardware processing circuitry.

A migration request can be submitted to the migration logic 406-A of the master core 104-A that it is desired to move the process 402 from the multi-core processor 100-A to the multi-core processor 100-B. This migration request can be submitted by the process 402 itself, or by another entity (e.g. a user, an operating system, an application, etc.). Moving the process 402 from one multi-core processor 100-A to another multi-core processor 100-B includes moving the context of the process 402 between the multi-core processors 100-A and 100-B. The context can include data in a local cache memory and registers of the slave core 102-A.

In response to the moving of the process 402 from the multi-core processor 100-A to the multi-core processor 100-B, the migration logic 406-B in the master core 102-B of the multi-core processor 100-B configures kernel-related features for the slave core 102-B of the multi-core processor 100-B. Also, the context of the process 402 is moved from the slave core 102-A to the slave core 102-B.

After configuring the kernel-related features for the slave core 102-B, the process 402 can start running on the slave core 102-B.

Certain logic (e.g. kernel-related features management logic 310 of FIG. 3 and migration logic 406-A and 406-B of FIG. 4) can be implemented with hardware processing circuitry or as a combination of machine-readable instructions and hardware processing circuitry. The machine-readable instructions can be executed on the hardware processing circuitry.

Storage media can be used to store machine-readable instructions, where the storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A multi-core processor comprising:
a plurality of slave cores, the slave cores being without operating system kernel-related features, and the slave cores to execute respective processes; and
a master core including the operating system kernel-related features, the operating system kernel-related features including one or a combination of control logic and interface logic,
wherein the master core is to:
perform tasks of processes among the respective processes running on the slave cores that involve usage of operating kernel-related features on behalf of the slave cores in response to calls from the slave cores; and
return results to the slave cores without interrupting the slave cores to switch between a user space and a kernel space.

2. The multi-core processor of claim 1, wherein the master core includes dedicated groups of the operating system kernel-related features for the respective slave cores, wherein each of the groups is dedicated to a respective one of the slave cores.

3. The multi-core processor of claim 1, wherein the control logic is to control translation look-aside buffers (TLBs) and the interface logic is to access information of a hardware component.

4. The multi-core processor of claim 1, wherein the master core includes an interface to handle a request from a given slave core of the slave cores to perform a task with respect to memory management, access of a hardware component, or process control.

5. The multi-core processor of claim 1, wherein the master core is to perform memory management or access of a hardware component for a process running on a given one of the slave cores, without invoking an operating system kernel.

6. The multi-core processor of claim 1, wherein when a request of a given process running on a given one of the slave cores involves use of a respective one of the operating system kernel-related features, the master core manages use of the respective operating system kernel-related feature.

7. The multi-core processor of claim 1, wherein a process running on a given one of the slave cores is executable to call a library including library routines when processing a request, the call of the library triggering performance of a task related to the request by at least one of the slave cores or the master core.

8. The multi-core processor of claim 7, wherein the task performed by the master core includes an access of a memory subsystem to identify an address corresponding to the request.

9. The multi-core processor of claim 1, wherein instructions running on respective multiple slave cores of the plurality of slave cores are able to share a context.

10. A method comprising:
executing processes on respective slave cores of a multi-core processor, the slave cores being without operating system kernel-related features;
performing, by a master core in the multi-core processor, tasks of processes among the respective processes running on the slave cores that involve usage of the operating kernel-related features on behalf of the slave cores in response to calls from the slave cores, wherein the operating system kernel-related features include one or a combination of control logic and interface logic; and
returning results by the master core to the slave cores without interrupting the slave cores to switch between a user space and a kernel space.

11. The method of claim 10, further comprising:
moving, by the master core in the multi-core processor, a given process of the processes from a first slave core of the multi-core processor to a second slave core of a second multi-core processor, the second multi-core processor including second slave cores and a second master core;
in response to the moving, establishing, by the second master core of the second multi-core processor, operating system kernel-related features for a given one of the second slave cores of the second multi-core processor; and
after establishing the operating system kernel-related features for the given slave core of the second multi-core processor, run the given process on the given slave core of the second multi-core processor.

12. The method of claim 10, wherein the control logic is to control translation look-aside buffers for the slave cores.

13. The method of claim 10, wherein the interface logic is to access information of hardware components for the slave cores.

14. A computing device comprising:
a plurality of multi-core processors, where each of the multi-core processors comprises:
a plurality of slave cores, the slave cores being without operating system kernel-related features, and the slave cores to execute respective instructions; and a master core including the operating system kernel-related features, the operating system kernel-related features including one or a combination of control logic and interface logic, wherein the master core is to:
perform tasks of instructions among the respective instructions executing on the slave cores that involve usage of operating kernel-related features on behalf of the slave cores in response to calls from the slave cores; and return results to the slave cores without interrupting the slave cores to switch between a user space and a kernel space.

15. The computing device of claim 14, wherein the instructions executable on the slave cores of a first of the multi-core processors include instructions of threads of a first process that share a context domain, and wherein the instructions executable on the slave cores of a second of the multi-core processors include instructions of threads of a second process that share a context domain.

* * * * *